United States Patent
Ganju et al.

(10) Patent No.: US 12,387,373 B2
(45) Date of Patent: Aug. 12, 2025

(54) 3D ENVIRONMENT RECONSTRUCTION FOR PERSISTENT OBJECT TRACKING

(71) Applicant: NVIDIA Corporation, Santa Clara, CA (US)

(72) Inventors: Siddha Ganju, Santa Clara, CA (US); Elad Mentovich, Tel aviv (IL); Marco Foco, Ticino (CH); Elena Oleynikova, Zurich (CH)

(73) Assignee: NVIDIA Corporation, Santa Clara, CA (US)

( * ) Notice: Subject to any disclaimer, the term of this patent is extended or adjusted under 35 U.S.C. 154(b) by 272 days.

(21) Appl. No.: 17/659,032

(22) Filed: Apr. 13, 2022

(65) Prior Publication Data
US 2023/0334697 A1    Oct. 19, 2023

(51) Int. Cl.
*G06T 7/73* (2017.01)
*G01C 21/34* (2006.01)
*G05D 1/00* (2024.01)
*G06T 7/11* (2017.01)
*G06T 17/00* (2006.01)

(52) U.S. Cl.
CPC ............ *G06T 7/75* (2017.01); *G01C 21/3484* (2013.01); *G05D 1/0246* (2013.01); *G06T 7/11* (2017.01); *G06T 17/00* (2013.01)

(58) Field of Classification Search
CPC .. G06T 7/75; G06T 7/11; G06T 17/00; G01C 21/3484; G01C 21/20; G01C 21/3807; G01C 21/3833; G01C 21/005; G05D 1/0246; G05D 1/0044; G05D 1/0251
See application file for complete search history.

(56) References Cited

U.S. PATENT DOCUMENTS

| 11,010,961 B2 * | 5/2021 | Stachniak | G06N 3/08 |
| 2006/0112034 A1 * | 5/2006 | Okamoto | G05D 1/0274 706/16 |

(Continued)

OTHER PUBLICATIONS

What is YOLO Algorithm? | Deep Learning Tutorial 31 (Tensorflow, Keras & Python). codebasics YouTube Channel. https://www.youtube.com/watch?v=ag3DLKsl2vk. Posted Dec. 25, 2020.*

(Continued)

*Primary Examiner* — Hunter B Lonsberry
*Assistant Examiner* — Henry R Hinton
(74) *Attorney, Agent, or Firm* — Taylor Duma L.L.P.

(57) ABSTRACT

In various examples, a 3D representation of an environment may be generated from sensor data, with objects being detected in the environment using the sensor data and stored as items that can be tracked and located within the 3D representation. The 3D representation of the environment and item information may be used to determine (e.g., identify or predict) a location or position of an item within the 3D representation and/or recommend a storage location for the item within the 3D representation. Using a determined location or position, one or more routes to the location through the 3D representation may be determined. Data corresponding to a determined route may be provided to a user and/or device. User preferences, permissions, roles, feedback, historical item data, and/or other data associated with a user may be used to further enhance various aspects of the disclosure.

23 Claims, 8 Drawing Sheets

(56) References Cited

U.S. PATENT DOCUMENTS

| | | | | |
|---|---|---|---|---|
| 2011/0235898 A1* | 9/2011 | Watanabe | ............... | G06T 7/33 |
| | | | | 382/154 |
| 2015/0290795 A1* | 10/2015 | Oleynik | ............... | G05B 19/42 |
| | | | | 700/257 |
| 2017/0072558 A1* | 3/2017 | Reynolds | ............... | G05D 1/024 |
| 2019/0086549 A1* | 3/2019 | Ushani | ............... | G05D 1/0088 |
| 2021/0279957 A1* | 9/2021 | Eder | ............... | G06V 20/64 |
| 2021/0397645 A1* | 12/2021 | Wang | ............... | G06F 18/22 |
| 2022/0245886 A1* | 8/2022 | Lieblich | ............... | G06T 15/08 |
| 2022/0327608 A1* | 10/2022 | Assouline | ............... | G06T 19/006 |
| 2022/0405874 A1* | 12/2022 | Barbour | ............... | G06V 10/762 |
| 2023/0150429 A1* | 5/2023 | Slutsky | ............... | H04N 13/271 |
| | | | | 345/419 |

OTHER PUBLICATIONS

Liu, et al.; "Furnishing Your Room by What You See: An End-to-End Furniture Set Retrieval Framework with Rich Annotated Benchmark Dataset," Retrieved from: arXiv: 1911.09299; Jan. 21, 2020, 12 pgs.

Bansal, et al.; "Marr Revisited: 2D-3D Alignment via Surface Normal Prediction," Retrieved from: arXiv:1604.01347; Apr. 5, 2016, 11 pgs.

* cited by examiner

3D ENVIRONMENT RECONSTRUCTION FOR PERSISTENT OBJECT TRACKING

BACKGROUND

Conventional systems for tracking and assisting users in locating items in an environment—such as a home, a warehouse, an office, or a store—typically rely on a tracking device affixed to each item of interest. The tracking devices may be implemented using Bluetooth, global system for mobile Communications (GSM), global positioning system (GPS), or radio frequency identification (RFID). While each of these technologies are suitable for tracking items in various scenarios, they are generally limited in their ability to precisely track and/or indicate the location of an item in an environment. For example, conventional systems may indicate a general area (e.g., a room) in an environment where an item may be located, but are unable to specifically point out the precise position of the item. Further, as each item requires a tracking device, items that do not have a tracking device cannot be tracked or located through existing systems. Also, conventional systems for tracking and assisting users in locating items in an environment may generate a path using a two-dimensional (2D) map of the environment or display the general direction of or distance to an item. These approaches are limited in their ability to account for obstacles or other features of the environment, which may impact a user's ability to reach and/or identify the item.

SUMMARY

Embodiments of the present disclosure relate to maintaining memory of objects using a 3D reconstruction of an environment. Systems and methods are disclosed that may be used to track and locate items within a 3D representation of an environment, provide alerts regarding the items, provide recommendations for storage locations of the items, and plan routes to the items.

In contrast to conventional systems, such as those described above, a 3D representation of an environment may be generated from sensor data, with objects being detected in the environment using the sensor data and stored as items that can be tracked and located within the 3D representation. The 3D representation of the environment and item information may be used to determine (e.g., identify or predict) a location of an item within the 3D representation and/or recommend a storage location for the item within the 3D representation. Using a determined location, one or more routes to the location through the 3D representation may be determined. Data corresponding to a determined route may be provided to a user and/or device. User preferences, permissions, roles, feedback, historical item data, and/or other data associated with a user may be used to further enhance various aspects of the disclosure.

BRIEF DESCRIPTION OF THE DRAWINGS

The present systems and methods for maintaining memory of objects using a 3D reconstruction of an environment are described in detail below with reference to the attached drawing figures, wherein.

DETAILED DESCRIPTION

Figure 1:
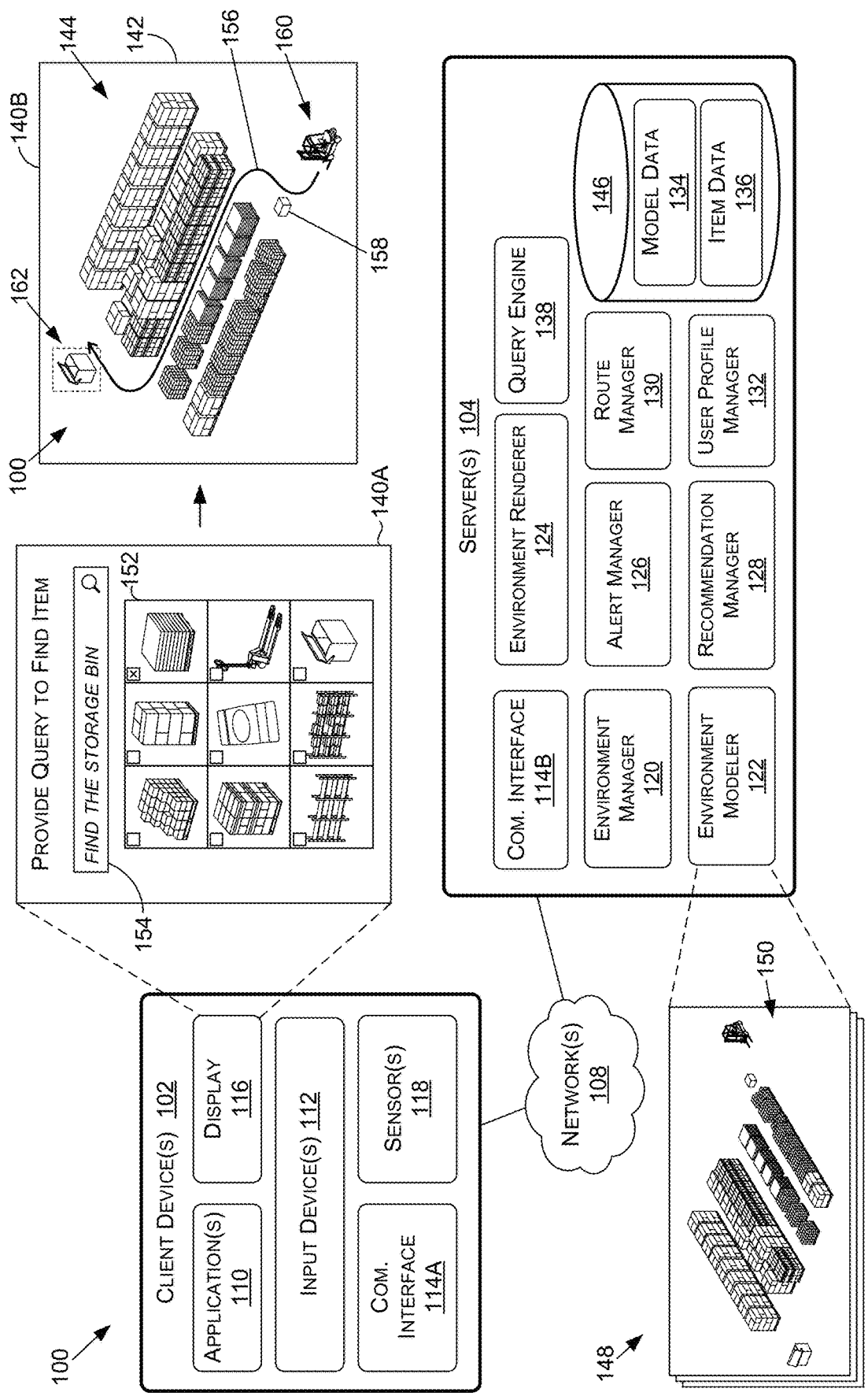
FIG. 1 is an example system diagram of an item tracking and locating system, in accordance with at least some embodiments of the present disclosure.

Systems and methods are disclosed related to maintaining a persistent memory of object state and position information using a 3D reconstruction of an environment. Disclosed approaches may be used to track and locate items corresponding to the objects within a 3D representation of an environment, provide alerts regarding the items, provide recommendations for storage locations of the items, and plan routes to the items.

In contrast to conventional systems, such as those described above, a 3D representation of an environment may be generated from sensor data, with objects being detected in the environment using the sensor data and stored as item representations that can be tracked and located within the 3D representation. In at least one embodiment, one or more videos of the environment may be captured using a client device, such as a mobile device. The 3D representation of the environment may be generated and/or updated using a 3D reconstruction of at least some of the environment generated, for example, using photogrammetry. One of more objects may be detected and segmented from the 3D reconstruction and associated with one or more items (e.g., to determine a 3D model for an object and corresponding item). One or more attributes of an item may be determined based on a corresponding object(s), such as those indicating one or more of a size of the object, a shape of the object, a pose of the object, a surface normal of the object, accessibility of the object, a location of the object, an orientation of the object, one or more surface normals of the object, a class or category of the object, or an affordance(s) of the object.

In at least one embodiment, the 3D representation of the environment and item information may be used to determine (e.g., identify or predict) a location of an item within the 3D representation and/or recommend a storage location for the item within the 3D representation. The determination may be based on item attributes and/or 3D geometry of the environment and objects in the environment, which may allow for more accuracy in predictions and/or determinations. Using a determined location, disclosed approaches may plan one or more routes to the location through the 3D representation while accounting for 3D geometry of the environment, 3D item location, and/or attributes of the user and/or device or machine that is to navigate a route (e.g., physical attributes and/or capabilities). Data corresponding to a determined route may be provided to a user and/or device, for example, within an interface displaying at least some of the 3D representation. User preferences, permissions, roles, feedback, historical item data, and/or other data associated with a user may be used to further enhance the accuracy of determinations, provide alerts to seek out items, provide personalized route planning to items, and/or provide security, privacy, and personalization for items and/or 3D representations of environments.

The systems and methods described herein may be used for a variety of purposes, by way of example and without limitation, these purposes may include systems or applications for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, digital twin systems, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 is an example system diagram of an item tracking and locating system 100 (also referred to as "system 100"), in accordance with at least some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may include, among other features, one or more client devices 102, one or more servers 104, and one or more network(s) 108. Although one client device 102 is illustrated in FIG. 1, this is not intended to be limiting. In examples, there may be any number of client devices 102. The system 100 (and the components and/or features thereof) may be implemented using one or more computing devices, such as the computing device 700 of FIG. 7, described in more detail below.

The client device(s) 102 may include an application 110, an input device(s) 112, a communication interface 114A, a display 116, and a sensor(s) 118. Although some components and/or features of the client device(s) 102 are illustrated in FIG. 1, this is not intended to be limiting. For example, the client device(s) 102 may comprise additional or alternative components, such as those described below with respect to the computing device 700 of FIG. 7.

The server(s) 104 may include, among other things, a communication interface 114B, an environment manager 120, an environment modeler 122, an environment renderer 124, an alert manager 126, a recommendation manager 128, a route manager 130, a user profile manager 132, a query engine 138, and a data store(s) 146. Although some components and/or features of the server(s) 104 are illustrated in FIG. 1, this is not intended to be limiting. For example, the server(s) 104 may comprise additional or alternative components, such as those described below with respect to the computing device 700 of FIG. 7 and/or the data center 800 of FIG. 8.

As an overview, the communication interface 114A of a client device 102 may be configured to manage internal and/or external communications for the client device 102, such as communications between the client device 102 and the server 104 over the network 108. Similarly, the communication interface 114B of the server 104 may be configured to manage internal and/or external communications for the server(s) 104, such as communications between the client device 102 and the server 104 over the network 108. The environment manager 120 of the server 104 may be configured to manage one or more 3D virtual environments (e.g., that are based on geometry of real-world environments). To this effect, the environment manager 120 may use the environment modeler 122 configured to generate and/or update one or more 3D models of at least one of the one or more 3D virtual environments and/or portions thereof, such as one or more objects thereof. The one or more 3D models may correspond to at least a portion of model data 134 stored in the data store(s) 146. The environment manager 120 may further use the environment modeler 122 configured to generate and/or update one or more items corresponding to the one or more objects and/or one or more attributes thereof. The one or more items and attributes may correspond to at least a portion of item data 136 stored in the data store(s) 146.

The application(s) 110 of the client device(s) 102 may be configured to provide one or more user interfaces, which may be used to interact with the server(s) 104, such as a user interface 140A and/or a user interface 140B (which may be referred to as "user interfaces 140"). As indicated in FIG. 1, the display 116 may be configured to display at least a portion of the user interface(s) 140. The input devices 112 may be configured to receive user inputs, for example, to the one or more user interfaces 140. The sensor(s) 118 may be configured to generate sensor data, such as image data. In at least one embodiment, the client device 102 may provide the sensor data to the server(s) 104, via the communication interface 114A, for use by the environment modeler 122 in generating and/or updating the one or more 3D models or other aspects of a 3D virtual environment.

The environment renderer 124 of the server 104 may be configured to render one or more aspects of the one or more 3D virtual environments, for example, using the one or more 3D models and/or attributes provided by the environment modeler 122. In at least one embodiment, the environment renderer 124 may render one or more images and/or frames, such as the image 142, using 3D graphics rendering, which may include light transport simulation (e.g., ray-tracing, path tracing, ray marching, light reservoir sampling, etc.). In at least one embodiment, the server 104 may provide data corresponding to the rendering to one or more of the client device(s) 102, via the communication interface 114B, for use by the application(s) 110 in presenting and/or updating content displayed in the one or more user interfaces 140.

The alert manager 126 may be configured to generate and provide one or more alerts to the client device(s) 102, which may be included in the content displayed in the one or more user interfaces 140. The recommendation manager 128 may be configured to generate and provide one or more recommendations to the client device(s) 102, which may be included in the content displayed in the one or more user interfaces 140. The route manager 130 may be configured to generate and provide one or more routes to the client device(s) 102, which may be included in the content display in the one or more user interfaces 140. The user profile manager 132 may be configured to record, store, verify, and/or update one or more user preferences, permissions, roles and/or other data associated with a user, which may be used by any of the various components of the server 104 to provide personalization and/or security to the system 100. The query engine 138 may be configured to process queries regarding the items stored in the data store 146, such as for one or more locations of an item. In any embodiment, such as where personal, confidential, and/or provide information is available, strict security and data privacy technologies and procedures may be employed to restrict unauthorized access to information stored. Example non-limiting technologies include encryption and identity verification (e.g., via multi-factor authentication, and/or password/pin code). For example, one or more 3D representations of one or more environments may be encrypted, in addition to any user profile data and item data, and access to the representations or user profile and item data may be restricted to only users with verified identities.

Components of the system 100 may communicate over network(s) 108. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the system 100 may communicate with one or more of the other components via one or more of the networks 108.

The display 116 may include any type of display capable of displaying a user interface (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 116 may include more than one display (e.g., a dual-monitor display). In some examples, the display 116 includes a touch-screen display, such as a touch-screen of a smart phone, tablet computer, laptop computer, or the like, where the touch-screen corresponds to at least one of the input device(s) 112 of a client device 102.

The client devices 102 may include one or more smart phones, laptop computers, tablet computers, desktop computers, robots, autonomous machines, autonomous vehicles, wearable devices, edge devices, game consoles, virtual reality systems (e.g., a headset, a computer, a game console, remote(s), controller(s), and/or other components), streaming devices, smart-home devices that may include an intelligent personal assistant, and/or other types of devices capable of supporting at least some of the functionality described herein.

In some examples, the client device(s) 102 may include one or more portions of the environment renderer 124, and may render the one or more aspects of the one or more 3D environments (e.g., using the application 110), while in other examples, the client device(s) 102 may receive display data (e.g., encoded video data) and use the display data to display the one or more portions of the one or more user interfaces 140 on the display 116, such as an image 142 (e.g., rendered using 3D graphics processing) of a 3D virtual environment 144 (which may be a 3D representation of the environment 150 and referred to as such). In some examples, a first client device 102 may render the one or more aspects while a second client device 102 may receive the display data and display the one or more aspects using the display data. Thus, any number of client devices 102 may be used to carry out one or more portions of disclosed approaches and any of the client devices 102 may have different (e.g., fewer or additional) components, as needed or required to carry out those portions. In one or more embodiments, any of the various components shown in FIG. 1 may be embodied, at least in part, on any number or combination of client devices 102 and/or servers 104.

The application 110 may be referred to as a single application for simplicity, but its functionality can be embodied by one or more applications in practice. Other devices can include one or more applications similar to the application 110. The application(s) 110 may include one or more mobile applications, computer applications, console applications, video game applications, computer programs, services, processes, and/or another type of application. It is contemplated herein that "application" be interpreted broadly. As an example, an application 110 can be installed on an operating system of a client device 102. As another example, an application 110 can include a service integrated into an operating system of a client device 102. In various implementations, an application 110 can be on a client device 102, as shown with respect to the application 110, but can at least partially be hosted server-side (e.g., on a server 104). In some cases, the application 110 comprises a web browser interfacing with a server 104 via a web site.

The input device(s) 112 may include any type of device(s) capable of providing user inputs to the user interfaces 140. The input device(s) 112 may include a keyboard, a mouse, a microphone(s), a touch-screen display, a controller(s), a remote(s), a headset (e.g., sensors of a virtual reality headset), and/or other types of input devices.

The sensor(s) 118 may include at least one sensor capable of generating sensor data representative of at least some aspect of an environment, such as an environment 150. For example, the sensor(s) 118 may generate sensor data 148, which the environment modeler 122 may use to generate and/or update one or more models corresponding to at least one of the one or more 3D virtual environments, such as a 3D virtual environment 144 (e.g., a 3D representation of the environment 150). The sensor(s) 118 may include any combination of an image sensor(s), a global navigation satellite systems (GNSS) sensor(s) (e.g., Global Positioning System (GPS) sensor(s)), a RADAR sensor(s), an ultrasonic sensor(s), LIDAR sensor(s), an inertial measurement unit (IMU) sensor(s) (e.g., accelerometer(s), gyroscope(s), magnetic compass(es), magnetometer(s), etc.), microphone(s), stereo camera(s), wide-view camera(s) (e.g., fisheye cameras), an infrared camera(s), a surround camera(s) (e.g., 360 degree cameras), a long-range and/or mid-range camera(s), a speed sensor(s) (e.g., for measuring the speed of the client device 102 and/or a robot), a vibration sensor(s), a steering sensor(s), a brake sensor(s) (e.g., as part of the brake sensor system), and/or other sensor types. The environment 150 may include many types of environments, such as an indoor environment, a warehouse, a store, a home, a manufacturing plant, a factory, a private property, a public property, etc.

In some examples, the sensor data 148 may be generated by forward-facing and/or side-facing cameras, such as a wide-view camera(s), a fisheye or surround-view camera(s), a stereo camera(s), and/or a long-range or mid-range camera(s). In some examples, more than one camera or other sensor may be used to incorporate multiple fields of view.

While the sensor(s) 118 is shown as being included in the client device 102, this need not be the case. For example, the sensor(s) 118 used to generate one or more portions of the sensor data 148 may be included on any number of devices, such as one or more client devices 102 and/or other devices. In at least one embodiment, the sensor(s) 118 are included, at least in part, in one or more robots, such as autonomous mobile robots (AMRs), one or more security cameras, one or more mobile devices (e.g., a smart phone), etc.

One or more embodiments may include multiple robots for performing one or more portions of item retrieval or data collection. By way of example, and not limitation, one or more robots may travel vertically and/or one or more robots may travel horizontally (e.g., a vertical or horizontal tracks). Each robot may have a specific set of grasping tools that allow them to hold and transport different types of items depending on different form factors of the items. Additionally or alternatively, different robots or other devices may provide different viewpoints for data collection and/or environmental reconstruction.

Figure 2:
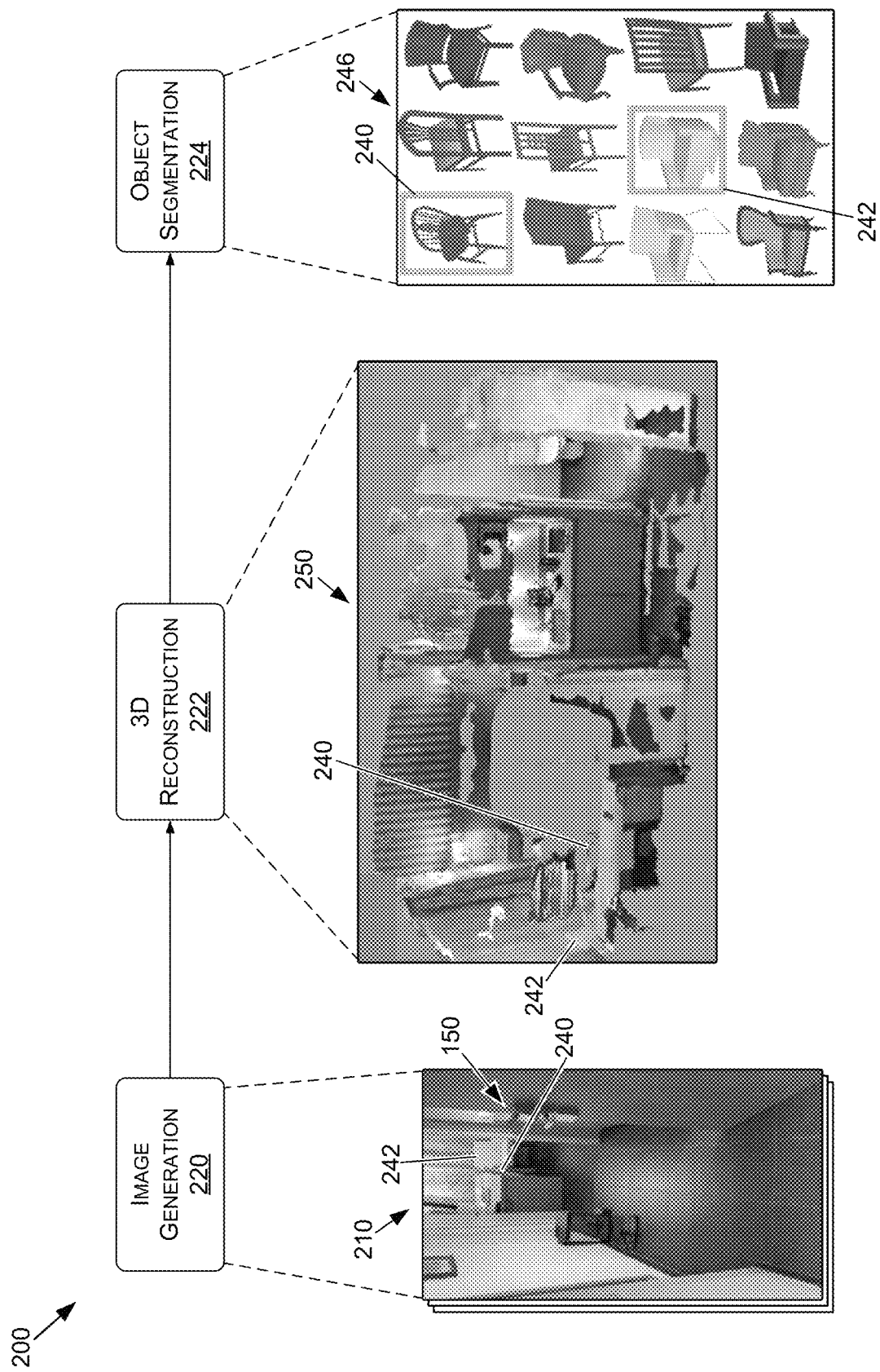
FIG. 2 is an illustration of an example flow diagram for generating and/or updating one or more aspects for a 3D model of an environment, in accordance with some embodiments of the present disclosure.

As described herein, the environment modeler 122 may be configured to generate and/or update one or more 3D models of a 3D virtual environment and/or portions thereof and generate and/or update one or more items corresponding to one or more objects and/or one or more attributes thereof. Referring now to FIG. 2, FIG. 2 is an illustration of an example process 200 that may be used to generate and/or update one or more aspects of one or more 3D virtual environments, in accordance with some embodiments of the present disclosure.

The process 200 may include image generation 220 to generate one or more images 210 that depict one or more portions of the environment 150. For example, the images 210 may include images of the environment 150 from different perspectives. The images 210 may include RGD and/or RGB-D images. In at least one embodiment, the images 210 include one or more images from a sequence of images capturing the environment 150. For example, responsive to user input from the input devices 112, a client device 102 may record a video of the environment 150 using the sensor(s) 118, and the video may correspond to at least some of the sensor data 148 (e.g., the client device 102 may be a smart phone that records video as a user walks through the environment 150). Additionally or alternatively, the client device 102 may be or be included on a robot that records a video of the environment 150 as it traverses and/or moves in the environment 150. In further examples, multiple videos from multiple wall-mounted security cameras could be used. The image generation 220 may be performed using the user interfaces 140 and/or the user interfaces 140 may be used to facilitate import of the images 210, which may be generated using one or more other user interfaces. In some examples (e.g., where a robot captures the images 210), no user interface 140 may be employed or a user interface 140 may be operated from another client device 102.

The process 200 may also include 3D reconstruction 212 to generate and/or update one or more portions of one or more 3D models of the environment 150. The 3D reconstruction 212 may be performed by the environment modeler 122 and may use any of a variety of 3D reconstruction techniques to generate and/or update a 3D representation 250 (or reconstruction) of the environment 150. In at least one embodiment, the environment modeler 122 generates the 3D representation 250 using photogrammetry. In at least one embodiment, the environment modeler 122 generates the 3D representation 250 using one or more GPUs and/or cloud processing.

The process 200 may further include object segmentation 224 to generate and/or update one or more portions of one or more 3D models and/or attributes of one or more items stored in association with the 3D virtual environment 144 (item metadata). The object segmentation 224 may be performed by the environment modeler 122 and may be used to recognize and extract one or more portions of objects, such as objects 240 and 242 from the 3D representation 250 (e.g., a point cloud). In at least one embodiment, the object segmentation 224 may use the environment modeler 122 to generate and/or retrieve 3D models for objects depicted in the images 210. For example, an approach may be used that employs surface normal predictions, along with appearance cues, to retrieve 3D models from an object model library 246 (e.g., computer-aided design models). The 3D models may be used to generate and/or update 3D models for the one or more objects. In one or more embodiments, one or more machine learning models (MLMs), such as convolutional neural networks (CNNs), may be used for surface normal prediction. The surface normals computed from the images 210 may be used to predict an object pose and the pose may be used to match the object to a model, as indicated in FIG. 2 with respect to the objects 240 and 242.

For example, and without limitation, an MLM(s) described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models. In various examples, an MLM may include one or more convolutional neural networks.

Additionally or alternatively, the environment modeler 122 may determine one or more portions of a 3D model for an object using mesh inputs. For example, example, a mesh model may be generated for an object where the environment modeler 122 determines it is unable to match the object with a model from the library.

In at least one embodiment, an item may be updated based at least on determining an observed object corresponds to a previously observed object associated with the item. For example, one or more MLMs, such as one or more twin neural networks, may be used to detect a previously observed object(s). A twin neural network may use the same weights while working in tandem on multiple different input vectors to compute comparable output vectors. One or more of the output vectors (e.g., for the previously observed object) may be precomputed and used as a baseline against which one or more other output vectors are compared (e.g., for the observed object being analyzed). In at least one embodiment, one or more of the twin neural networks may be trained using triplet loss with margin alpha. One-shot learning may be used at inference time. In various examples, one or more of the twin neural networks may be used to personalize object and/or item recognition at any suitable time described herein, which an item or object may be detected (e.g., to confirm storage at a location, to determine an item that is a subject of a query, to determine the item is moving or was moved and the location is to be updated, etc.). In various embodiments, the sensors 118 from one or more client devices 102 and/or other devices may form a sensor network, such as a wireless sensor network providing multiple data collection sources spatially and/or temporally (e.g., sets of LIDAR data, sets of image data, etc.). In order to consolidate the data sources, such as to account for potentially redundant data, the environment modeler 122 may use various approaches such as twin neural networks and self-supervised networks.

In at least one embodiment, the environment modeler 122 may use the process 200 and/or other processes and analysis to generate and/or update one or more items corresponding to the one or more objects extracted using the images 210. For example, the one or more items may be stored in the item data 136 in the data store(s) 146. Each item may include an item identifier stored in association with one or more of the 3D models (e.g., determined using the process 200) and may correspond to one or more of the objects. Further, each item or item ID may be stored in associated with one or more attributes. The one or more attributes may be determined using the process 100 and/or additional analysis or processing of the sensor data 148. In various examples, one or more of the attributes may be associated with geometry of the item and/or corresponding object(s). Examples of attributes may include one or more attributes indicating one or more of a size of the one or more objects, a shape of the one or more objects, a pose of the one or more objects, a surface normal of the one or more objects, accessibility of the one or more objects (e.g., whether the item is reachable by fork lift, whether the item is reachable by a person at ground level or using a ladder, etc.), or an affordance(s) of the one or more objects.

The user profile manager 132 may be configured to record, store, verify, and/or update one or more user preferences, permissions, roles and/or other data associated with a user, which may be used by any of the various components of the server 104 to provide personalization and/or security to the system 100. For example, the user data may be used to limit access to items by user and/or role. Thus, while an environment may include multiple items for multiple users, only users with permissions to search for an item may be granted access to a predicted or known location of the item. For example, one or more users may be assigned as owners of an item with the ability to grant and/or revoke permissions and/or access for other users regarding the item. Thus, when a user searches for a generic keyword like "keys," the results returned and/or displayed may only be for the user's keys and/or keys the user is authorized to access.

Additionally or alternatively, the user data may be used to limit access to 3D environments and/or portions thereof by user and/or role. Thus, while multiple environments may be stored by the server 104 or an environment may include multiple areas, only authorized users with sufficient/requisite permissions or rights to view and/or search for an item in that area or granted access to information of an environment. For example, one or more users may be assigned as owners of a 3D environment or area with the ability to grant and/or revoke permissions and/or access for other users regarding the 3D environment or portion thereof. In at least one embodiment, a user may be assigned as an owner of an area and/or environment based at least on using the client device 102 to generate or create the area and/or 3D environment (e.g., to capture or provide the sensor data used to generate the environment).

In at least one embodiment, the attributes may correspond to one or more locations or positions of the item, for example, relative to the 3D virtual environment 144 (e.g., coordinates, location label, and/or pose, for example, if observed). By way of example and not limitation, the environment modeler 122 may determine a location or position of the object(s) corresponding to the item, and record the location or position with respect to the item. Suitable approaches for determining the location or position may include localization with respect to the 3D reconstruction 212 and/or the environment 150. Localization may include odometry, landmark localization, pose estimation, simultaneous localization and mapping (SLAM), and the like.

In at least one embodiment, the environment modeler 122 may store multiple locations or positions (e.g., one or more coordinates in the 3D virtual environment and/or real environment) for a single item. One or more of the locations or positions may be marked as a most recent location or position, for example, based at least on the environment modeler 122 most recently observing the item at the location or position (e.g., using the process 200, localization, etc.) and/or based at least on data from one or more users indicating or identifying the location or position. For example, when the environment modeler 122 determines an item is at a new location or position, the environment modeler 122 may update the most recent location or position stored in the item data 136. One or more previous locations may be retained and/or analyzed for determining recommendations and/or probabilities with respect to the location(s) or position(s) of the item, as described herein.

In at least one embodiment, a 3D virtual environment may be updated over time. For example, the process 200 and/or the 3D reconstruction 222 for the 3D virtual environment 144 may be performed at times t, t+1, t+2, and so forth to generate corresponding snapshots of the environment 150. In at least one embodiment, the snapshots may store differences and/or changes between the snapshots so as to reduce storage. For example, if only an item location changes between t and t+1, the snapshot for t+1 may only store the new location for the item (e.g., and pointers or other stored values changed for one or more other snapshots). In at least one embodiment, an update to the 3D virtual environment 144 may be initiated by a user and/or client device 102. For example, the user may provide, via the input device 112, user input to initiate an update to at least a portion of the 3D virtual environment 144 (e.g., using a user interface 140). In at least one embodiment, continuous sensor data recording and/or updating of the 3D virtual environment 144 may be avoided. For example, a user may choose to provide video when an object has been added to the environment 150 or an object has been moved. The video may change the item data 136 and/or the model data 134 while maintaining user preferences.

Figure 3A:
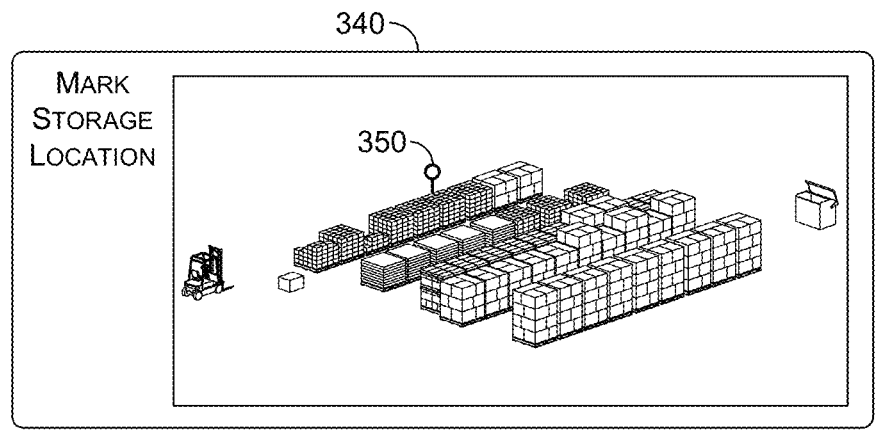
FIG. 3A is an illustration of an example user interface for indicating a location of an item in an environment, in accordance with some embodiments of the present disclosure.

Referring now to FIG. 3A, FIG. 3A is an illustration of an example user interface 340 for indicating a location of an item in an environment, in accordance with some embodiments of the present disclosure. The user interface 340 may be included in the user interfaces 140 of FIG. 1. The user interface 340 includes a location indicator 350, which may be provided by user input to the input devices 112. For example, the location indicator 350 may include a pin or other marker dropped into a depiction of the environment 150, such as an image of the environment 150, the 3D virtual environment 144 (e.g., using augmented reality), or a corresponding map. The location indicator 350 may identify or indicate the location or position of the item in the 3D virtual environment 144 and/or the environment 150 to the environment modeler 122, which may be recorded by the environment modeler 122. While the location indicator 350 is shown as an example, other examples of location indicators may be used that identify or otherwise indicate a location or position, such as verbal indicators, descriptive textual indicators, etc.

In one or more embodiments, the recommendation manager 128 may recommend one or more locations or positions for an item. In such examples, the location indicator may correspond to a selection of a location or a position of the one or more locations or positions (e.g., from a list of locations or positions). Additionally or alternatively, the data indicating the location or position may include location data associated with the user and/or client device 102, such as sensor data generated using the sensor(s) 118 and/or other sensors in the environment 150. For example, the environment modeler 122 may analyze the data (e.g., image analysis, motion analysis, gyroscope-based analysis, etc.) to determine the item was or is being placed in the recommended location.

The query engine 138 may be configured to process queries regarding the items stored in the data store 146, such as for one or more locations of an item. The queries may include user submitted queries, queries submitted from a client device 102, and/or system submitted queries. In at least one embodiment, the query engine 138 may locate an item based at least on searching the 3D virtual environment(s) 144 in the data store(s) 146 for the item. In at least one embodiment, the query engine 138 may be incorporated, at least in part, into a personal assistant. The personal assistant may be accessed, for example, using a client device 102. In one or more embodiments, the query engine 138 may be optimized for rapid retrieval, allowing for the system 100 to be more performant, personalized, and have reduced latency while enforcing privacy constraints, for example, by running on the user's device itself. In one or more embodiments, searching may be executed using a lightweight process, e.g., by operating on pre-computed metadata which may be included in the item data 136.

A query may include an image-based and/or text-based query. For example, a query may include data representing one or more images. The user interface 140A is an example of an interface which may be used to provide at least one of the images of a query. For example, user input via the input device 112 may select an image 152 for a query using the user interface 140A. In one or more embodiments, the image 152 may be selected from a list of images, with each image corresponding to an item in the data store 146. Thus, the image 152 may identify and/or be stored in association with the item(s) for the query. In further examples, the image(s) 152 may be a photograph or other image, which may not be stored in association with an item in the data store 146. In such examples, in processing the query, the query engine 138 may analyze the one or more images 152 to determine one or more features of the image (e.g., using one or more MLMs). The query engine 138 may then select and/or identify one or more items from the one or more items in the data store 146 for the query based at least on the one or more features and the one or more attributes of the item(s). For example, the user may take a photo and/or provide a live stream of video of an object for a query.

The user interface 140A also provides an example of an interface which may be used to provide text and/or audio for a query, such as natural language text. For example, user input via the input device 112 may provide a text-based query 154 (e.g., a natural language query via text and/or audio input) using the user interface 140A. In one or more embodiments, the query engine 138 may use the text-based query 154 to identify and/or select the item(s) for the query. For example, in processing the query, the query engine 138 may analyze the text of the query to determine one or more features of the text (e.g., using one or more natural language processing techniques). The query engine 138 may then select and/or identify one or more items from the one or more items in the data store 146 for the query based at least on the one or more features and the one or more attributes of the item. Examples of text-based queries include "Where is the fork lift?," "Office Keys," "Find pallet #7584," etc. In addition to or alternatively from image-based and/or text-based queries, other forms of user input may be used to define a query. For example, a user may provide user input via an input device 112 that modifies one or more object properties, object classes, and/or item data 136 (e.g., metadata) to define a query. Using such human-in-the-loop inputs may improve query quality.

Examples of the features include one or more of text, keywords, object categories, object classes, query submission time, semantic information regarding one or more portions or view of an environment corresponding to the query (e.g., depicted in an image(s)), one or more object sizes and/or dimensions, one or more confidence scores associated with one or more other features and/or inferences made using an MLM, image color information, image luminance information, detected object location with respect to one or more other objects in the environment, a user ID and/or identifier associated with the query, features indicating one or more of a size of one or more objects, a shape of one or more objects, a pose of one or more objects, a surface normal of one or more objects, an affordance(s) of one or more objects, feature embeddings, etc.

In at least one embodiment, the query engine 138 may, responsive to a query, search the item metadata and/or attributes stored in the item data 136 (e.g., an index of items) for one or more matching items (e.g. to the query features). By way of example and not limitation, the query engine 138 may extract one or more keywords and/or text features from the query for a comparison with the item data 136 for the search. For example, the query engine 138 may search for an exact text match of an item. In some cases, the search may identify multiple matches and/or similar matches. For example, the query engine 138 may assign similarity or confidence scores to an item that quantifies a likelihood the query corresponds to the item (e.g., based on similarities in item metadata to query features).

By way of example and not limitation, the item data 136 may include an item of each key of twenty keys. If a user searches for keys, based on a time and/or other inputs, as well as the user, the query engine 138 can attempt to narrow down the twenty keys to one or a subset of keys that may be the subject of the query. If there is a specific time a user profile maintained by the user profile manager 132 indicates that the user typically takes its office keys, that personalization may be factored into the narrowing process, which may result in at least an item representing the office keys being selected (e.g., due to having a highest confidence score, due to a confidence score exceeding a threshold, etc.).

Having determined an item corresponding to a query, the query engine 138 may search for the item in a 3D virtual environment so as to provide one or more potential locations or positions in response to the query. Various factors may be used to select, filter out, and/or rank or score one or more locations or positions for an item. For example, in at least one embodiment, the query engine 138 may provide a location or position for the item based at least on the location or position being marked as a most recent location or position for the item. Additionally or alternatively, the query engine 138 may provide a location or position for the item based at least on a time (e.g., storage time) corresponding to the location or position associated with the item. For example, the longer the time the less likely the location or position may be provided and vice versa. Additionally or alternatively, the query engine 138 may provide a location or position for the item based at least on a frequency (e.g., storage frequency) corresponding to the location or position associated with the item. For example, the lower the frequency the less likely the location or position may be provided, and vice versa. Additionally or alternatively, the query engine 138 may provide a location or position for the item based at least on one or more affordances and/or other attributes of the item and/or an item corresponding to the location. For example, one or more locations or positions may be selected or scored higher based at least on the query engine 138 determining compatibility with one or more of the affordances and/or other item attributes and vice versa. This may include determining an item and corresponding location or position are geometrically compatible, such as that the item will physically fit within a region of the 3D reconstruction corresponding the location or position, the item can sit at rest at the location or position (e.g., won't fall or slip), the geometry of the location or position allows for an affordance or use of the item, etc.

By way of example, where the location or position is a drawer and the item is a set of keys, the attributes may indicate the drawer can be used for storing keys and/or the keys can be stored in a drawer. As described herein, the affordances may be determined based at least on the geometry of the object(s) corresponding to the item (e.g., using a 3D model to determine whether the item would fit in a drawer) and/or a category or class assigned to the item. As another example, if the item is a set of keys that are for driving a vehicle, the affordance may indicate the keys can be located in a vehicle.

The one or more locations or positions may be provided to the user, for example, in a user interface 140 responsive to the query. Providing a location or position may include presenting and/or displaying one or more indications of the location or position. For example, the location or position may be provided using a location identifier or indicator, which may be presented on a client device 102 audibly and/or visually. In at least one embodiment, a location indicator may include a render of the one or more locations or positions in the 3D virtual environment displayed on the client device 102 (e.g., rendered by the environment renderer 124). Additionally or alternatively, a name of the location or a description of the position in the environment (e.g., adjacent or proximate to one or more other objects, relative to one or more other objects, etc.) may be displayed on the client device 102.

In one or more embodiments, the route manager 130 may plan one or more routes to at least a location of the one or more locations through the 3D representation of the environment. For example, based at least on the query engine 138 selecting a location or position for a response to a query and/or a user selection of the location or position (e.g., in the presentation to the user responsive to the query), the route manager 130 may plan a route to the location and/or display or present the route to the user (e.g., in a user interface 140). Planning a route to a location may be based at least on one or more attributes of the user and/or client device 102 (e.g., robot) that is to traverse the route. The one or more attributes may be determined from user profile data managed by the user profile manager 132. Examples include one or more attributes indicating one or more of a location or positions corresponding to the user and/or the client device 102 (e.g., a current location, orientation, pose, etc. associated with the query), a size or other dimension(s) of the user and/or client device 102, a shape of the user and/or client device 102, a pose of the user and/or client device 102, physical capabilities of the user and/or client device 102, etc.

In at least one embodiment, one or more paths for one or more routes may be determined and/or selected based at least on the geometry of the 3D virtual environment and the one or more attributes. For example, a route 156 is indicated in FIG. 1, which may account for an object 158 (or obstacle) in the environment 150 as indicated by the 3D virtual environment 144. For example, for a robot, a path may go under a table based on the height of the robot being less than the table. However, for a person, the route may avoid or be less likely to go under the table based at least on the height of the user being greater than the table, and/or the physical capabilities associated with the user (e.g., based on the user having crutches). Using disclosed approaches, path suggestions or selections may be personalized to the user and/or device. For example, different robots in a warehouse may receive different path suggestions by accounting for different dimensions and/or maneuvering capabilities of the robots. As a further example, different people may receive different path suggestions by accounting for disabilities.

In at least one embodiment, one or more cost maps may be used for route planning. In some embodiments, route planning may include computing one or more distance fields (corresponding to distances to objects and/or surfaces in the environment), and from the one or more distance fields (e.g., a Euclidean Signed Distance Field) the cost map may be derived. The cost map may correspond to a volumetric reconstruction of the physical environment, for example, determined using the process 200. The cost map may be used for collision avoidance and/or path planning. For example, the cost map may be used by one or more downstream navigation components used for path planning, object avoidance, localization, and/or other operations for controlling the client device 102 and/or facilitating navigation of the user through the physical environment.

By way of example, the route 156 may be generated based at least on the location 160 associated the user and/or client device 102 and/or the location 162 associated with the item. The route 156 may be multi-dimensional and represented using any suitable approach, such as using one or more trajectories, points, coordinates, and/or functions. A determined route or path may include vertical and/or horizontal components. In a data center, for example, a route for a robot may include horizontal and vertical segments. In one or more embodiments, a route may be determined in 3D, for example, traversing ramps and other objects or obstacles in the environment. For a machine capable of aerial travel, a route may include one or more aerial segments. In at least one embodiment, the route 156 may be generated and/or selected based at least on the route manager 130 determining the route 156 is the shortest route that satisfies one or more hard or soft constraints associated with the user and/or client device 102. While the route 156 is shown using a path through an environment, the route 156 may be presented using audible directions, textual directions, step-by-step directions, etc. In one or more embodiments, the presentation of the route 156 may point to or otherwise indicate a particular location corresponding to the item. In at least one embodiment, the environment renderer 124 may present the item in a visual distinct manner in the user interface 140, such as using highlighting, a changed color(s) etc. This may assist a user in located the item in the environment.

Figure 3B:
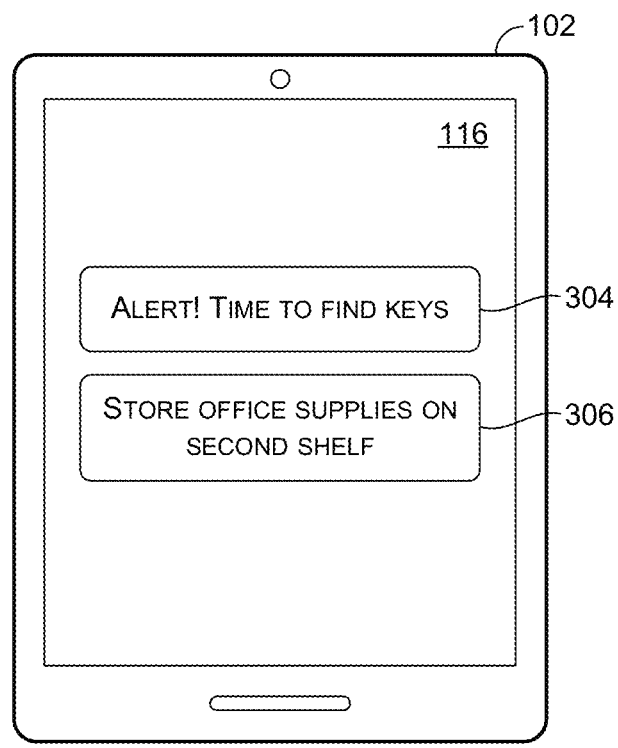
FIG. 3B is an illustration of an example client device presenting a user interface including an item-based alert and an item-based recommendation, in accordance with some embodiments of the present disclosure.

As described herein, the recommendation manager 128 may recommend one or more locations or positions for storage of an item(s). The one or more recommended locations or positions for an item may be selected and/or determined using similar approaches and/or factors as described with respect to the query engine 138 determining one or more locations or positions for an item. Thus, for example, one or more locations or positions may be recommended for storage based at least on the recommendation manager 128 determining the item will physically fit in the locations and/or at the positions (e.g., one or both using the 3D representation 250), that the item was previously stored in the locations or positions, and/or that the locations or positions are preferred locations or positions based on storage types specified by the user, amongst other factors. Referring now to FIG. 3B, FIG. 3B is an illustration of an example client device 102 presenting a user interface (e.g., corresponding to a user interface 140) including an item-based alert 304 and an item-based recommendation 306, in accordance with some embodiments of the present disclosure.

While the item-based recommendation 306 and the item-based alert 304 are shown as being presented on a display 116 of the client device 102, one or more item-based recommendations and/or item-based alerts may be presented using any suitable modality, including modality described herein with respect to results from the query engine 138. In at least one embodiment, a recommendation may be selected by a user and/or client device (e.g., via the input device 112). For example, a user may select a graphical interface element corresponding to the item-based recommendation 306 to select the corresponding location. As a further example, the client device 102 and/or may implicitly select the corresponding location, for example, by moving to or toward the location, storing the item in the location, etc. In at least one embodiment, the user profile manager 132 may, based at least on determining the location or position was selected, update corresponding user profile data, for example, to record the location or position as a current storage location or position and/or to update data indicating a frequency of the item being stored by the user at the location or position. In at least one embodiment, the storage location or position may be determined, or confirmed, based at least on analyzing sensor data from the sensors 118, such as image data, motion data, and/or location data for determining or predicting confirmation of storage (e.g., visual confirmation).

In at least one embodiment, the route manager 130 may plan one or more routes to at least a location of the one or more locations recommended by the recommendation manager 128 through the 3D representation of the environment. For example, a route may be determined and/or presented similar to what is described herein for the route 156, but using a recommended location (which may include pose, orientation, height, 3D coordinates, adjacent or proximate objects, position relative to other objects, etc., that may be visually indicated to the user).

As described herein, the alert manager 126 may be configured to generate and provide one or more alerts to the client device(s) 102, such as the item-based alert 304. In at least one embodiment, the item-based alert 304 may be presented based at least on determining and/or predicting one or more storage and/or retrieval times for one or more items based at least on historical storage and/or retrieval data, which may be included in the user profile data maintained by the user profile manager 132. For example, the historical data may correspond to any number of prior storage and/or retrieval times and/or locations for one or more items and/or similar items for one or more users (e.g., the historical data may be personalized to the user and/or be based on aggregated user data). Any suitable approach may be used to determine an item-based alert, such as event prediction and/or anticipation techniques (e.g., statistical, MLM, etc.), where the event may include storage and/or retrieval of the item, any item, and/or an item class or type. Additionally or alternatively, one or more alerts may be scheduled by the user and/or client device 102. For example, a reminder may be provided every day and/or based at least on determining one or more user and/or system configured trigger criteria are satisfied. In one or more embodiments, the criteria may be based at least on audio input. For example, the alert manager 126 may analyze the audio to determine the audio includes one or more trigger criteria and provide an alert based on the determination. To illustrate the foregoing, the client device 102 receiving audio capturing a fire alarm may trigger the alert manager 126 to alert the user to find a fire extinguisher.

In at least one embodiment, the recommendation manager 128 may be used to recommend one or more locations or positions for storage and/or retrieval of the item(s) for an alert. For example, one or more recommendations may be included in the item-based alert 304. As a further example, one or more recommendations may be generated based at least on a selection of the item-based alert 304 by a user and/or client device 102 (e.g., in a user interface 140). In the example of a fire extinguisher, the alert manager 126 may use the recommendation manager 128 to provide a recommendation for where the fire extinguisher is likely located (which may include providing a route to the item). Additionally or alternatively, the alert manager 126 may provide a query to the query engine 138 to search for the fire extinguisher. In one or more embodiments, once an item(s) is identified, the recommendation manager 128 and the query engine 138 may use the same components for locating the item, planning a route to the item and/or or providing a route to the item.

In at least one embodiment, the client device(s) 102 may include a robot or other machine and the alert manager 126 may provide an item-based alert for one or more items to the machine (e.g., an autonomous or semi-autonomous machine, and ARM, etc.). Based on the item-based alert and/or route to an item(s) and/or the user, the machine may retrieve and/or bring the item(s) to the user. Thus, for example, a robot may preemptively bring one or more items to a user based on patterns, scheduling, and/or other triggers (e.g., receiving user requests or queries for the items).

In any example, one or more users and/or client devices 102 may provide feedback regarding a location or position and/or route provided to the user (e.g., via a user interface 140) and/or client device 102. For example, where the query engine 138 is used to provide a location or position and/or route for the user, the user may provide feedback on whether the item was found at the location or position. In response to the feedback, the user profile manager 132 may update corresponding user data and/or the environment manager 120 may update corresponding item data. For example, if the item is indicated as found, the environment manager 120 may update the item data 136 to indicate the item was found at the location or position, which may increase the likelihood of the location or position being predicted and/or recommended in the future. If the item is indicated as not found, the environment manager 120 may update the item data 136 to indicate the item was not found at the location or position, which may decrease the likelihood of the location or position being predicted and/or recommended in the future. Additionally or alternatively, another location or position and/or route may be provided based on the indication. For example, where the locations or positions were ranked, a lower ranked location or position (e.g., having the next highest rank) may be used. This process may repeat until the item is found. Similarly, the user may provide feedback (e.g., a rating) on recommended storage locations or positions for items to impact future recommendations and/or predictions and/or to receive one or more additional recommendations for a particular session.

Additionally or alternatively, the system 100 (e.g., a server 104) may request information from one or more users and/or client devices 102 (e.g., using a user interface 140, an alert, a notification, etc.), which may be responded to using any suitable approach described herein (e.g., using an input device 112). For example, the system 100 may determine one or more portions of missing information in the model data 134 and/or the item data 136 (e.g., metadata) for a 3D reconstruction of an environment. Based at least on the determination, the system 100 may request information the system 100 may use to compensate for or supply the missing information. For example, where a section of a room was occluded in the sensor data 148, the system 100 may guide the user in collecting the missing data, whether it be in the form of supplying additional sensor data used to reconstruct the missing data or otherwise (e.g., description of the missing information, answers to questions about the missing information, etc.).

Figure 4:
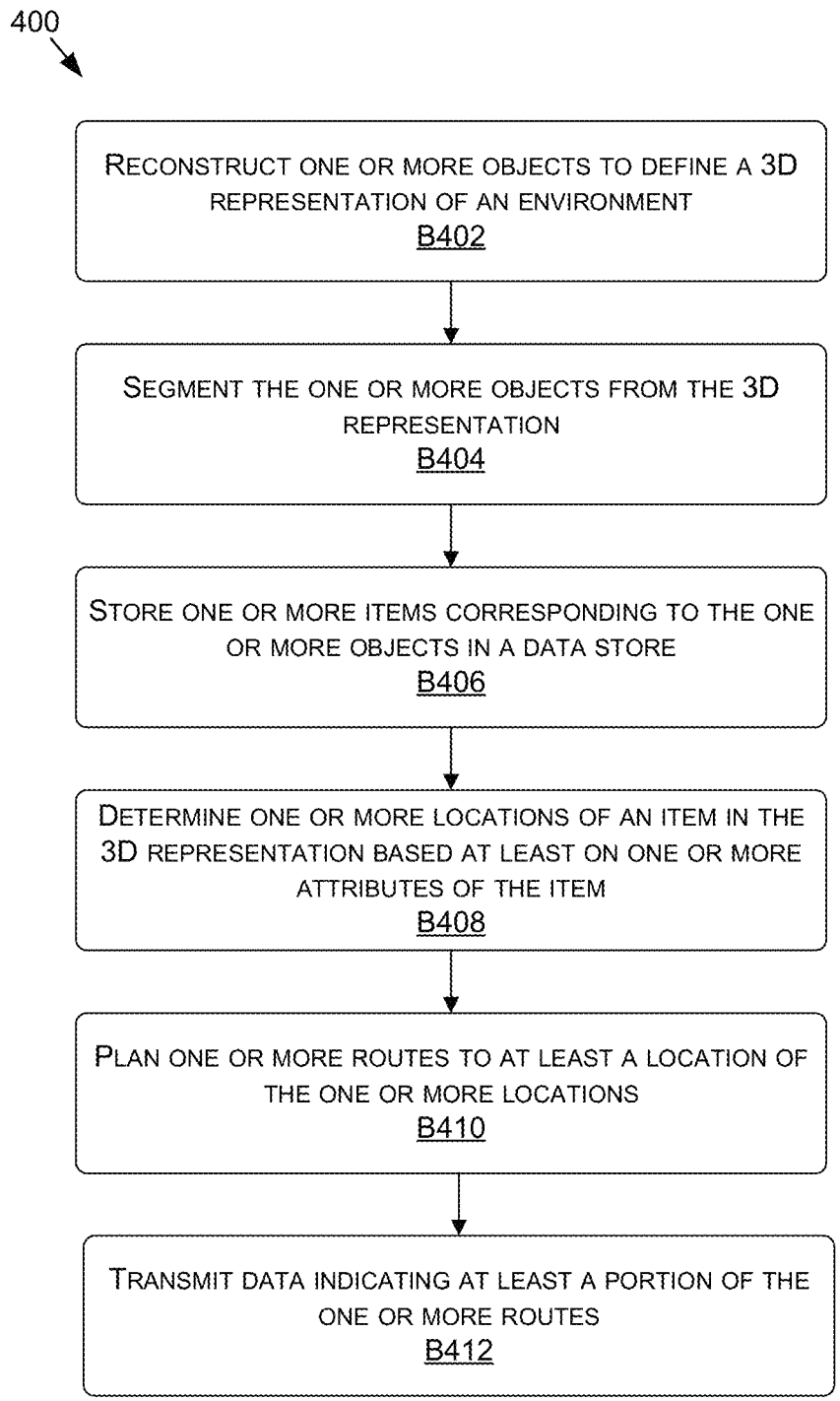
FIG. 4 is a flow diagram showing a method a server may perform for tracking and locating items based on 3D reconstruction, in accordance with some embodiments of the present disclosure.

Now referring to FIG. 4, each block of method 400, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to FIGS. 1 and 2. However, the methods may additionally or alternatively be executed by any one system, or any combination of systems, including, but not limited to, those described herein.

FIG. 4 is a flow diagram showing the method 400 the server(s) 104 may perform for tracking and locating items based on 3D reconstruction, in accordance with some embodiments of the present disclosure.

The method 400, at block B402, includes reconstructing one or more objects to define a 3D representation of an environment. For example, the environment modeler 122 may reconstruct at least a portion of geometry of the objects 240 and 242 in the environment 150 using image data representing one or more videos of the environment 150 to define the 3D representation 250 of the environment 150.

The method 400, at block B404, includes segmenting the one or more objects from the 3D representation. For example, the environment modeler 122 may segment the objects 240 and 242 from the 3D representation 250 of the environment 150.

The method 400, at block B406, includes storing one or more items corresponding to the one or more objects in a data store. For example, the environment manager 120 may store one or more items corresponding to the objects 240 and 242 in the data store 146. Each item of the one or more items may include including one or more attributes associated with the geometry of a corresponding object.

The method 400, at block B408, includes determining one or more locations or positions of an item in the 3D representation based at least on one or more attributes of the item. For example, the query engine 138 may determine, for at least an item of the one or more items, the location 162 of the item in the 3D representation 250 of the environment 150 based at least on the one or more attributes of the item.

The method 400, at block B410, includes planning one or more routes to at least a location (position) of the one or more locations (positions). For example, the route manager 130 may plan the route 156 to the location 162 of the one or more locations through the 3D representation 250 of the environment 150.

The method 400, at block B412, includes transmitting data indicating at least a portion of the one or more routes. For example, the communication interface 114B of the server 104 may transmit data indicating at least a portion of the routes 156 to a client device 102 (e.g., responsive to a query associated with the item).

Figure 5:
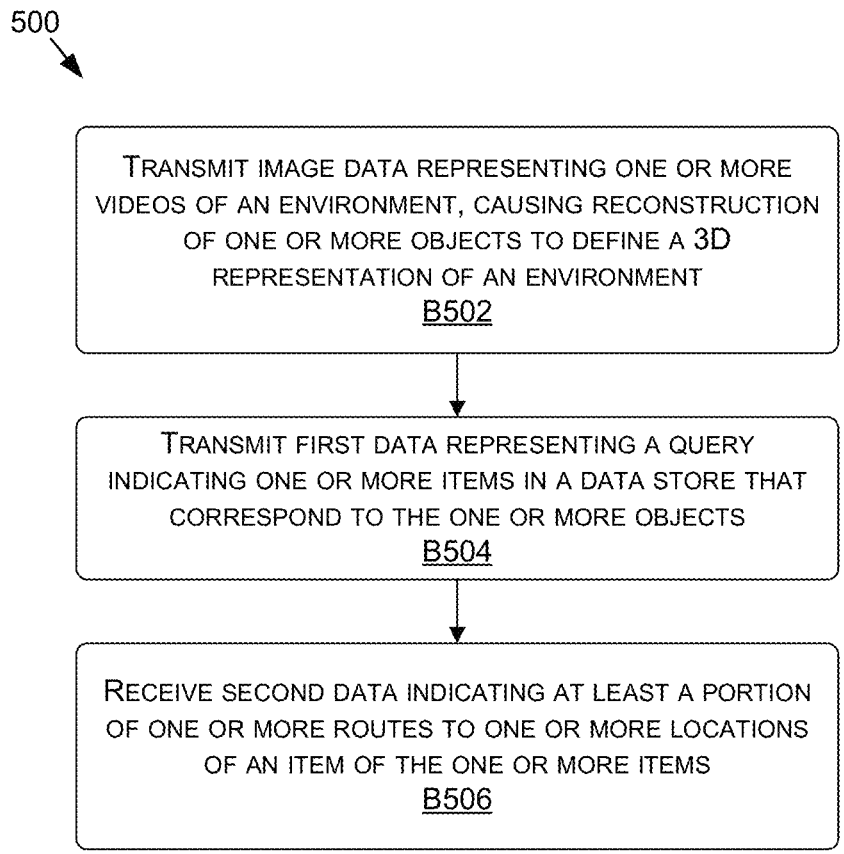
FIG. 5 is a flow diagram showing a method a client device may perform for tracking and locating items using a 3D reconstruction of an environment, in accordance with some embodiments of the present disclosure.

Referring now to FIG. 5, FIG. 5 is a flow diagram showing a method 500 a client device 102 may perform for tracking and locating items using a 3D reconstruction of an environment, in accordance with some embodiments of the present disclosure.

The method 500, at block B502, includes transmitting image data representing one or more videos of an environment, causing reconstruction of one or more objects to define a 3D representation of an environment. For example, the communication interface 114A may transmit, to the server(s) 104, the sensor data 148 representing one or more videos of the environment 150. The transmitting may cause the server 104 to reconstruct at least a portion of geometry of the objects 240 and 242 in the environment 150 using the sensor data 148 to define at least a portion of the 3D representation 250 of the environment 150.

The method 500, at block B504, includes transmitting first data representing a query indicating one or more items in a data store that correspond to the one or more objects. For example, the communication interface 114A may transmit, to the server 104, first data representing the text-based query 154 indicating one or more items in the data store 146 that correspond to the objects 240 and 242. One or more attributes of an item of the one or more items may be associated with the geometry.

The method, at block B506, includes receiving second data indicating at least a portion of one or more routes to one or more locations or positions of an item of the one or more items. For example, the communication interface 114A may receive, responsive to the text-based query 154, second data indicating at least a portion of one or more routes through the 3D representation 250 of the environment 150 to one or more locations or positions of the item, the one or more locations or positions being based at least on the one or more attributes of the item.

Figure 6:
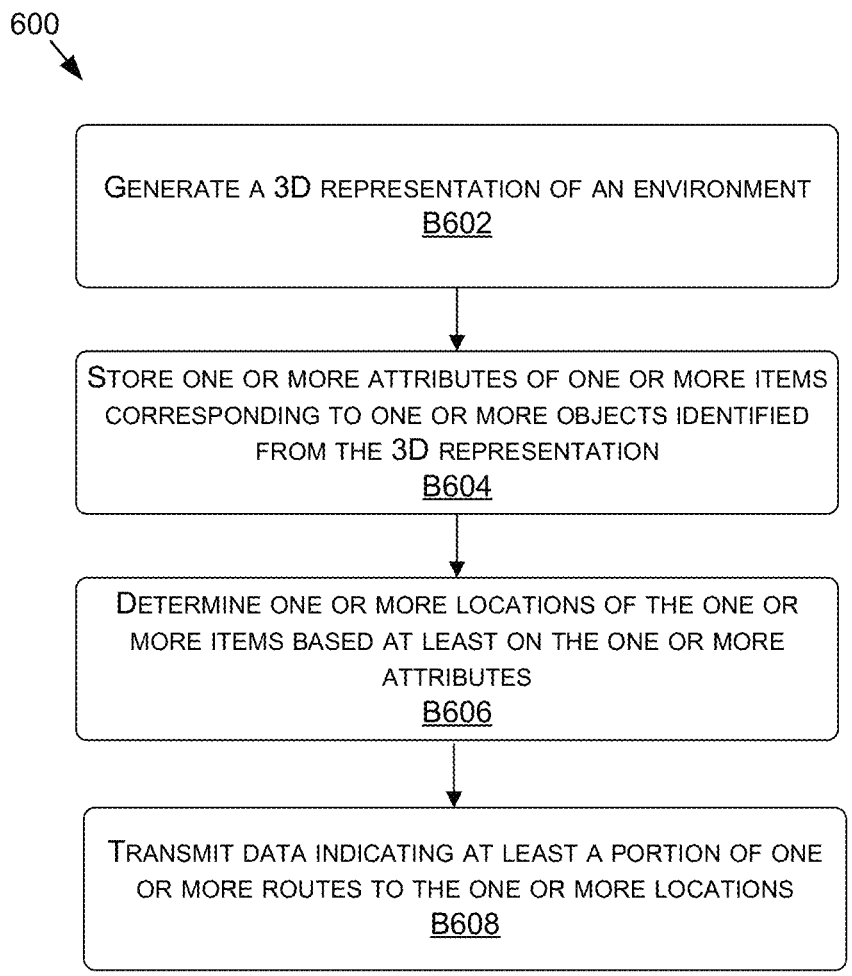
FIG. 6 is a flow diagram showing a method for tracking and locating items using a 3D representation of an environment, in accordance with some embodiments of the present disclosure.

Referring now to FIG. 6, FIG. 6 is a flow diagram showing a method 600 for tracking and locating items using the 3D representation 144 of the environment 150, in accordance with some embodiments of the present disclosure.

The method 600, at block B602, includes generating a 3D representation of an environment. For example, the environment modeler 122 may generate the 3D representation 144 of the environment 150.

The method 600, at block B604, includes storing one or more attributes of one or more items corresponding to the one or more objects identified from the 3D representation. For example, the environment manager 120 may store one or more attributes of one or more items corresponding to the one or more objects in the item data 136.

The method 600, at block B606, includes determining one or more locations or positions of the one or more items based at least on the one or more attributes. For example, the query engine 138 may determine one or more locations or positions of the one or more items based at least on the one or more attributes.

The method 600, at block B608, includes transmitting data indicating at least a portion of one or more routes to the one or more locations or positions. For example, the communication interface 114B may transmit data indicating at least a portion of one or more routes to the one or more locations or positions to a client device 102.

Example Computing Device

Figure 7:
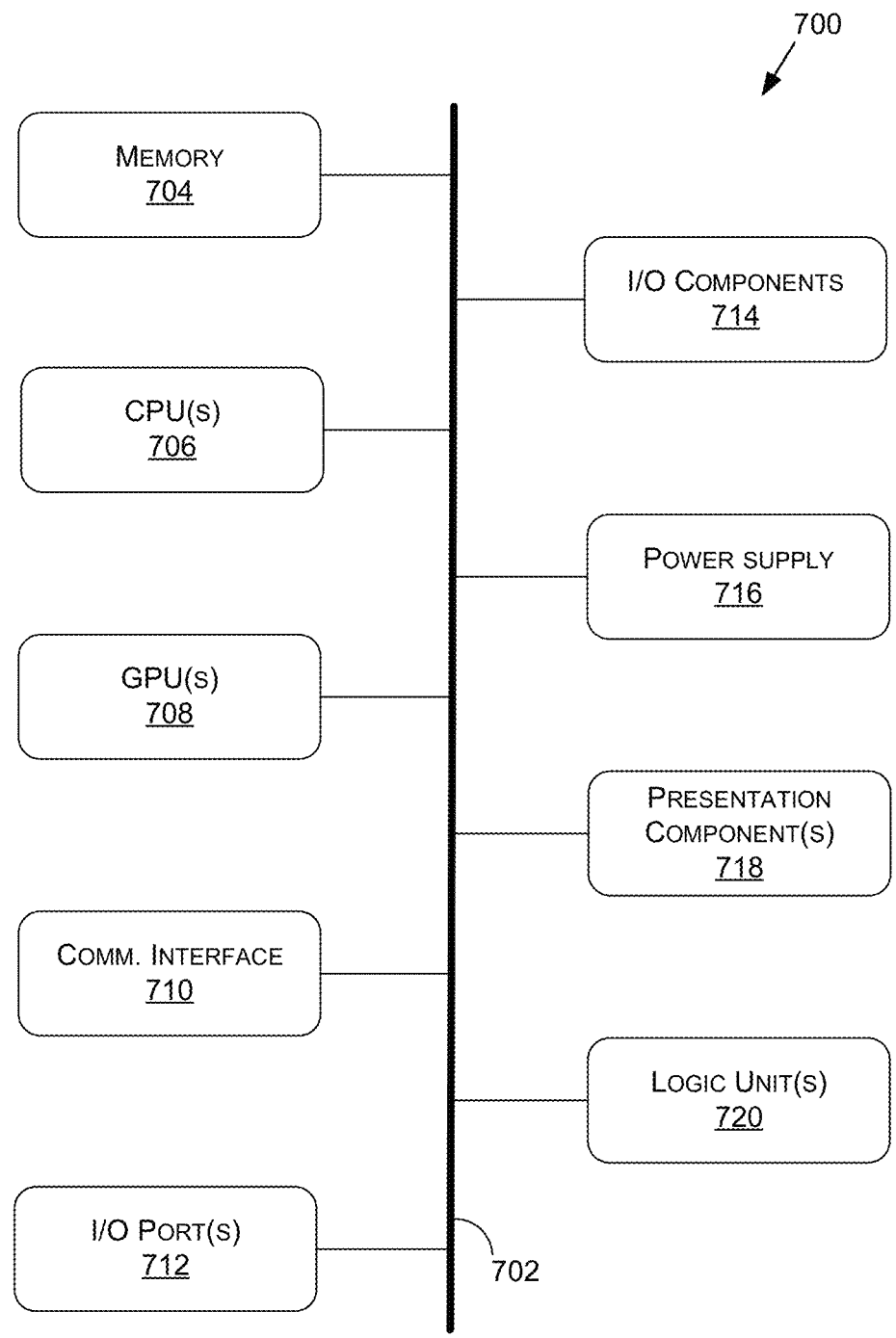
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
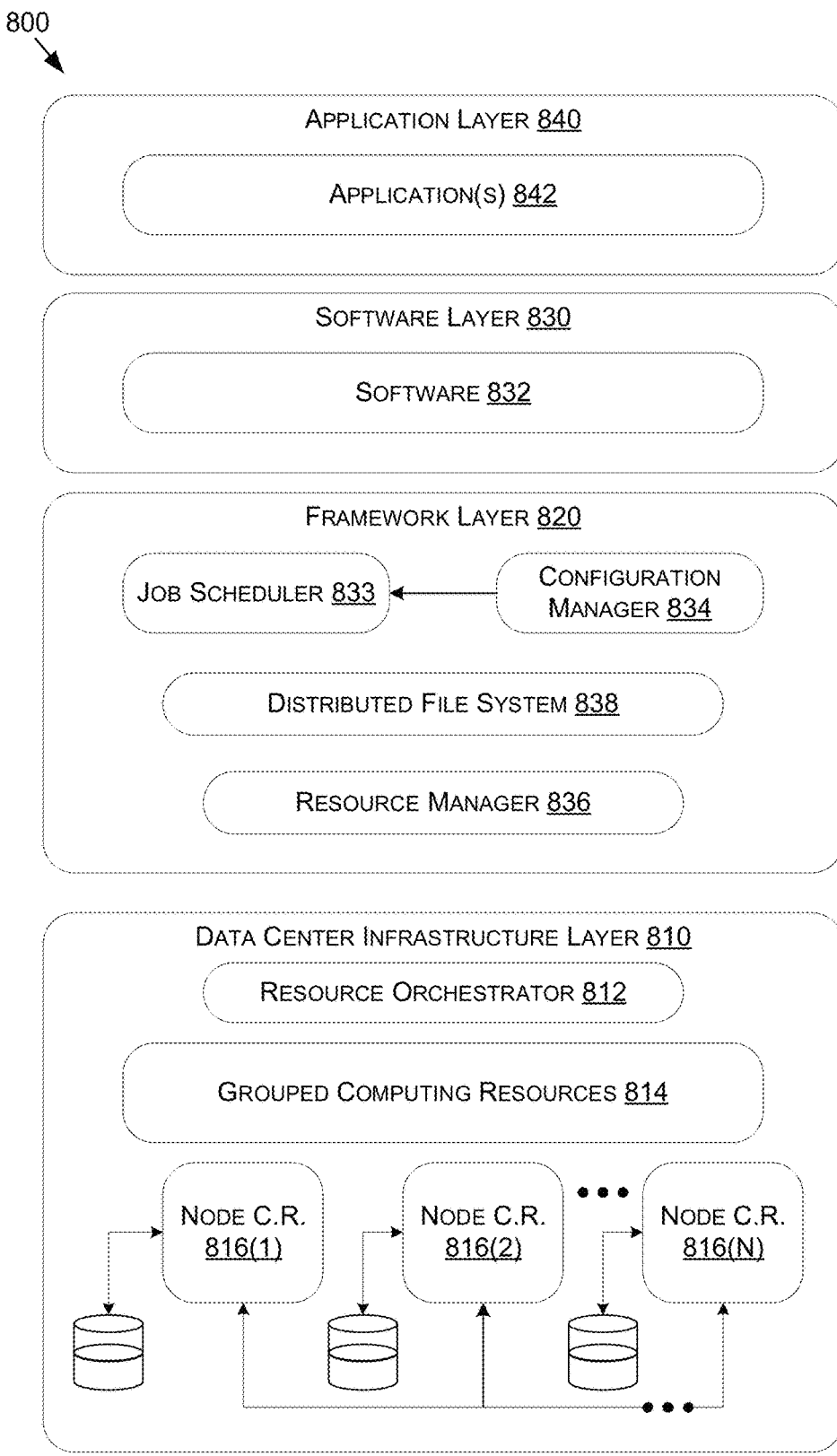
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 833, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 833 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 833. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
one or more processing units to execute operations comprising:
defining, using image data of one or more videos of an environment, a simulated three-dimensional (3D) representation of at least a portion of an environment that includes a plurality of objects;
determining, based at least on analyzing the simulated 3D representation of the environment, one or more areas in the simulated 3D representation having one or more geometries that are geometrically compatible with a geometry of a simulated object, the simulated object including one or more attributes that correspond to at least an object of the plurality of objects;
determining, using the simulated 3D representation and based at least on the one or more areas being geometrically compatible with the geometry of the simulated object, one or more predicted locations of the object in the environment; and
planning one or more routes through the environment to at least the one or more predicted locations using the simulated 3D representation of the environment.

2. The system of claim 1, wherein the one or more attributes indicate one or more of a size of the one or more objects, a shape of the one or more objects, a surface normal of the one or more objects, or an affordance of the one or more objects.

3. The system of claim 1, the operations further include comprising receiving data indicating a user selection of a storage location for the simulated object in the simulated 3D representation, wherein the determining the one or more locations is based at least on the storage location indicated by the user selection.

4. The system of claim 1, the operations further comprising:
determining, for a plurality of locations in the simulated 3D representation of the environment, probability scores representing a likelihood of the object being positioned at the locations based at least on previous storage locations of the object; and
selecting the one or more predicted locations from the plurality of locations based at least on one or more first probability scores for the one or more predicted locations being greater than one or more second probability scores for one or more second predicted locations,
wherein the determining of the one or more predicted locations is further based at least on the one or more first probability scores being greater than the one or more second probability scores.

5. The system of claim 1, the operations further comprising:
transmitting data indicating at least a portion of the one or more routes to one or more devices, the transmitting being responsive to a query that includes data representing one or more images;
analyzing the one or more videos to determine one or more features of the image; and
selecting the simulated object from one or more simulated objects based at least on the one or more features and the one or more attributes, wherein the determining of the one or more areas is based at least on the selecting of the simulated object.

6. The system of claim 1, the operations further comprising:
transmitting data indicating at least a portion of the one or more routes to one or more devices, the transmitting being responsive to a query that includes a natural language query;
analyzing the natural language query to determine one or more features of the query; and
selecting the simulated object from one or more simulated objects based at least on the one or more features and the one or more attributes, wherein the determining of the one or more areas is based at least on the selecting of the simulated object.

7. The system of claim 6, wherein the one or more devices include a machine that uses the data to navigate to the one or more predicted locations in the environment based at least on the at least a portion of the one or more routes.

8. The system of claim 6, wherein the one or more devices include a user device that uses the data to display navigation instructions corresponding to the at least a portion of the one or more routes.

9. The system of claim 1, wherein item data corresponding to at least the object of the plurality of objects is stored in a data store in association with a user profile including user data indicating one or more of previous locations of the simulated object in the simulated 3D representation of the environment, a location in the simulated 3D representation of the environment that was marked, using user input, as a current location of the simulated object, or one or more times to provide a reminder to find the simulated object.

10. The system of claim 1, wherein the planning of the one or more routes personalizes a path to the one or more predicted locations based at least on one or more user mobility characteristics associated with a user profile and a 3D geometry of the environment.

11. The system of claim 1, the operations further comprising transmitting data indicating at least a portion of the one or more routes to one or more devices, wherein the transmitting is triggered using a user recommendation algorithm that is based at least on one or more historical patterns of user requests for a user account, the user requests associated with locations for the simulated object.

12. The system of claim 1, wherein the system is comprised in at least one of:
a control system for an autonomous or semi-autonomous machine;
a perception system for an autonomous or semi-autonomous machine;
a system for generating or maintaining a digital twin of one or more physical objects;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

13. A method comprising:
transmitting, to one or more servers, image data representing one or more videos of an environment, the transmitting causing the one or more servers to define at least a portion of a simulated three-dimensional (3D) representation of the environment using the image data;

transmitting, to the one or more servers, first data representing a query indicating one or more simulated objects in a data store that correspond to one or more objects in the environment, wherein one or more attributes of the one or more simulated objects correspond to the one or more objects; and receiving, responsive to the query, second data indicating at least a portion of one or more routes through the environment to one or more predicted locations of the one or more objects, the one or more predicted locations determined based at least on the one or more servers analyzing the simulated 3D representation of the environment to determine one or more areas in the simulated 3D representation that are geometrically compatible with the one or more attributes of the one or more simulated objects, the one or more areas corresponding to the one or more predicted locations.

14. The method of claim 13, wherein the image data is generated using one or more sensors of a robot, and the robot uses the second data to navigate to the one or more predicted locations based at least on the at least a portion of the one or more routes.

15. The method of claim 13, wherein the image data is generated using one or more sensors of a user device, and the user device uses the second data to display navigation instructions to the one or more predicted locations in the environment based at least on the at least a portion of the one or more routes.

16. The method of claim 13, wherein the query includes one or more of data representing one or more images that at least partially depict a representation of the one or more simulated objects or a natural language query associated with the one or more simulated objects.

17. A processor comprising:
one or more circuits to generate a simulated three-dimensional (3D) representation of an environment using image data depicting at least a portion of the environment, store one or more attributes of one or more simulated objects corresponding to one or more objects identified from the simulated 3D representation of the environment in a data store, determine one or more predicted locations of the one or more objects in the environment based at least on analyzing the simulated 3D representation to determine one or more areas that are geometrically compatible with the one or more attributes of the one or more simulated objects, the one or more areas corresponding to the one or more predicted locations, and transmit data indicating at least a portion of one or more routes through the environment to the one or more predicted locations.

18. The processor of claim 17, wherein the one or more attributes indicate one or more of a size of the one or more objects, a shape of the one or more objects, a surface normal of the one or more objects, or an affordance of the one or more objects.

19. The processor of claim 17, wherein the one or more circuits are further to receive data indicating a user selection of one or more storage locations for the one or more simulated objects in the simulated 3D representation, wherein the determining the one or more predicted locations is based at least on the one or more storage locations indicated by the user selection.

20. The processor of claim 17, wherein the determining the one or more predicted locations is based at least on:
determining a probability corresponding to a likelihood the one or more simulated objects correspond to a location of the one or more predicted locations based at least on one or more previous storage locations of the one or more simulated objects; and
selecting the one or more predicted locations based at least on the probability, wherein the transmission of the data is based at least on the selecting of the one or more predicted locations.

21. The processor of claim 17, wherein the processor is comprised in at least one of:
a control system for an autonomous or semi-autonomous machine;
a perception system for an autonomous or semi-autonomous machine;
a system for generating or maintaining a digital twin of one or more physical objects;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

22. The system of claim 1, wherein the analyzing of the simulated 3D representation of the environment comprises:
comparing, to the one or more geometries associated with the one or more areas, a 3D model representative of the geometry of the simulated object; and
determining, based at least on the comparing, that the one or more areas are geometrically compatible with the simulated object such that the simulated object fits within the one or more areas.

23. The processor of claim 17, wherein the one or more circuits are further to:
determine that the one or more simulated objects fit within the one or more areas,
wherein the determination of the one or more areas that are geometrically compatible with the one or more attributes of the one or more simulated objects is based at least on the determination that the one or more simulated objects fit within the one or more areas.

* * * * *